(12) United States Patent
Aoki et al.

(10) Patent No.: US 7,276,874 B2
(45) Date of Patent: Oct. 2, 2007

(54) STORAGE APPARATUS, SEEK CONTROL METHOD AND PROGRAM

(75) Inventors: Takahiro Aoki, Kawasaki (JP); Shunji Saitoh, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 0 days.

(21) Appl. No.: 11/434,967

(22) Filed: May 16, 2006

(65) Prior Publication Data

US 2007/0182356 A1    Aug. 9, 2007

(30) Foreign Application Priority Data

Feb. 3, 2006    (JP)    ............... 2006-026620

(51) Int. Cl.
*G05B 11/01*    (2006.01)
(52) U.S. Cl. .................. 318/560; 318/609; 318/610; 318/432; 360/75; 360/78.01
(58) Field of Classification Search ............... 318/560, 318/609, 610, 432; 360/75, 78.01, 78.07
See application file for complete search history.

(56) References Cited

U.S. PATENT DOCUMENTS 5,377,058 A * 12/1994 Good et al. .............. 360/75
5,994,868 A * 11/1999 Takeuchi et al. ............ 318/616
6,628,581 B1 * 9/2003 Tsukahara et al. ....... 369/44.28
6,898,035 B1 * 5/2005 Chainer et al. .............. 360/51
2004/0190397 A1 * 9/2004 Kuwahara et al. ....... 369/44.11

FOREIGN PATENT DOCUMENTS

JP    5-041048    2/1993
JP    10-125020    5/1998

* cited by examiner

*Primary Examiner*—Rina Duda
(74) *Attorney, Agent, or Firm*—Greer, Burns & Crain, Ltd.

(57) ABSTRACT

A movement controlling unit performs movement control of a head toward a target track on a magnetic disk medium driving a head actuator, and a position controlling unit performs position control of the head actuator in accordance with proportional integral calculations such that a deviation of a head position relative to a track center is eliminated when the moving head arrives at the target track. A gain retaining unit retains an integral gain of the proportional integral calculations in an increased state during a predetermined retention time from the start of the position control, and a gain switching unit switches the increased integral gain smoothly to the original integral gain when the retention time has elapsed.

20 Claims, 19 Drawing Sheets

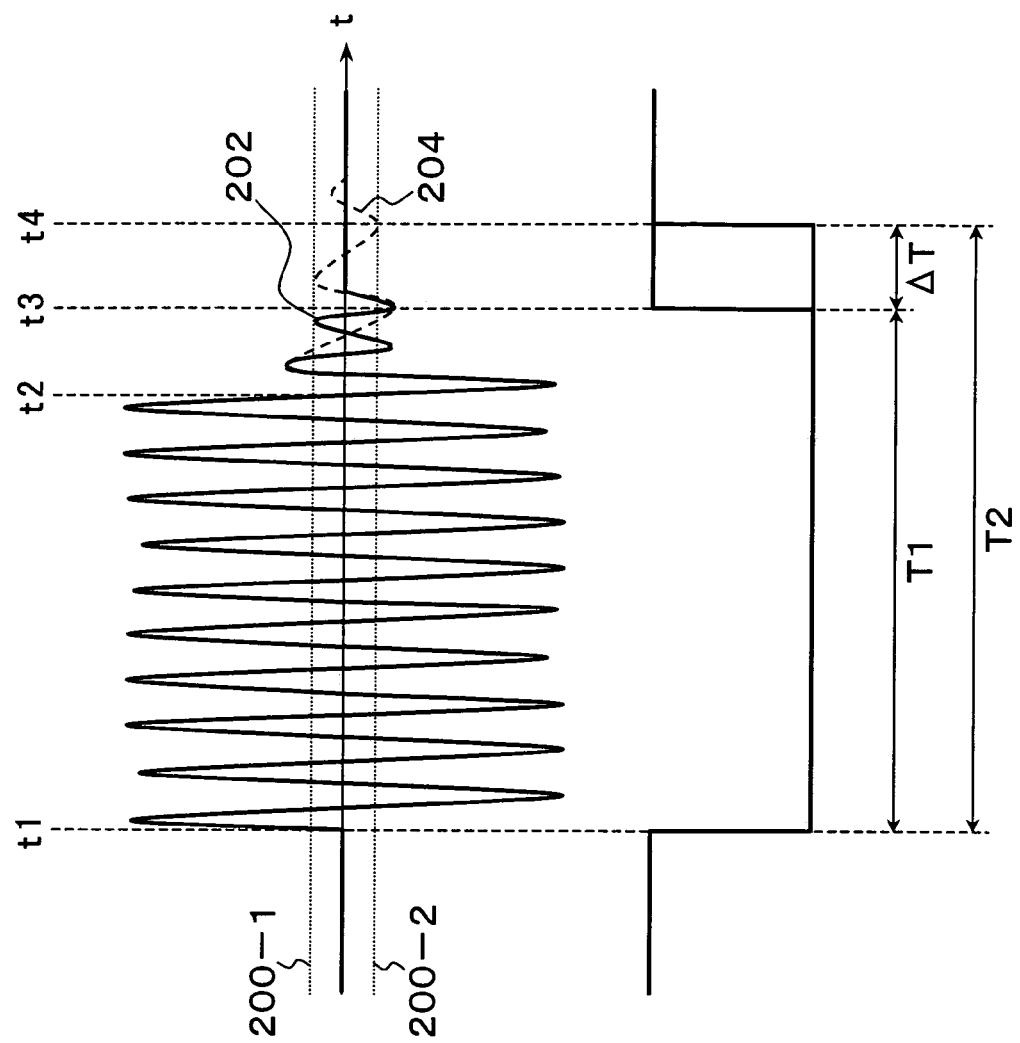

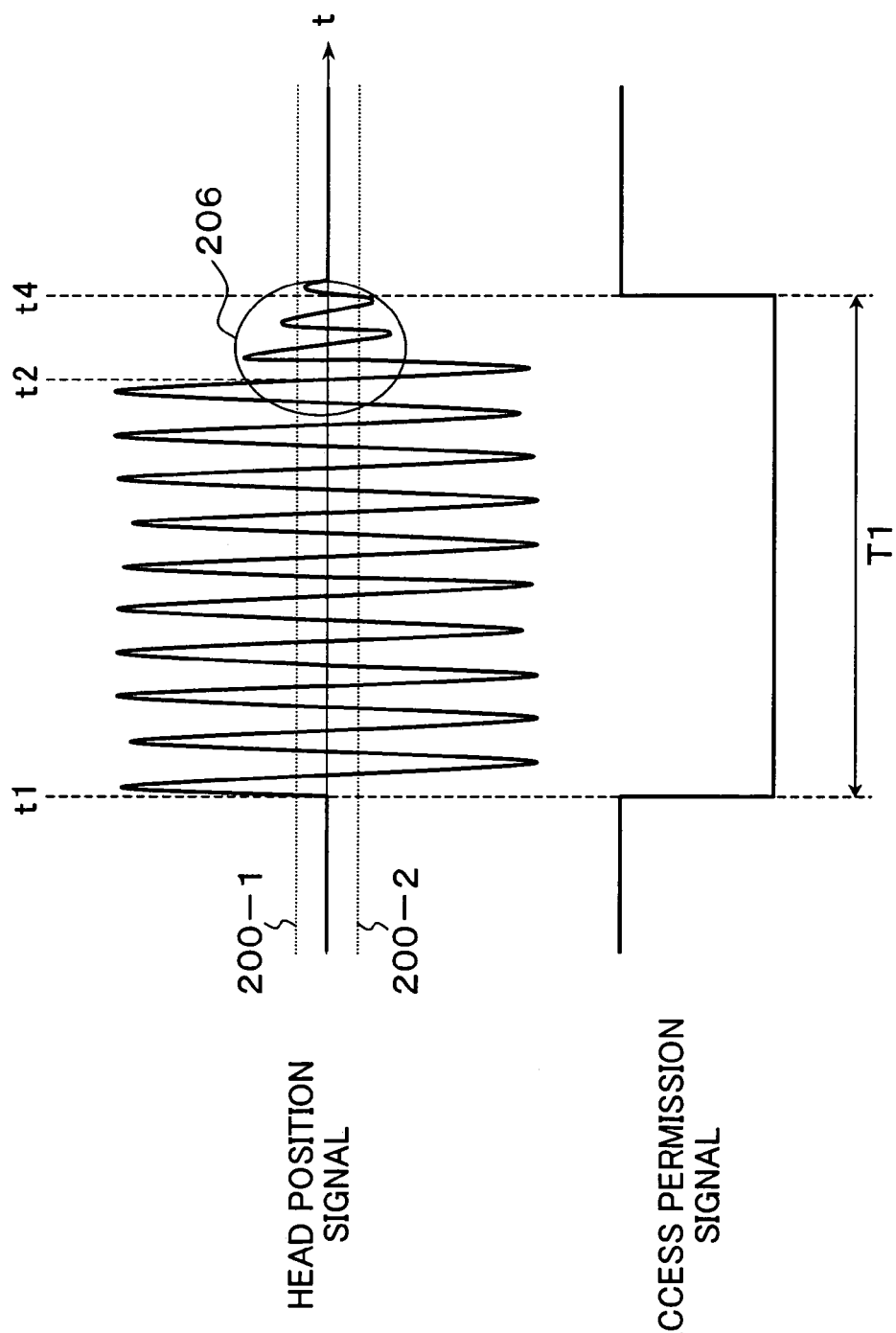
PRIOR ART
FIG. 2A
PRIOR ART
FIG. 2B

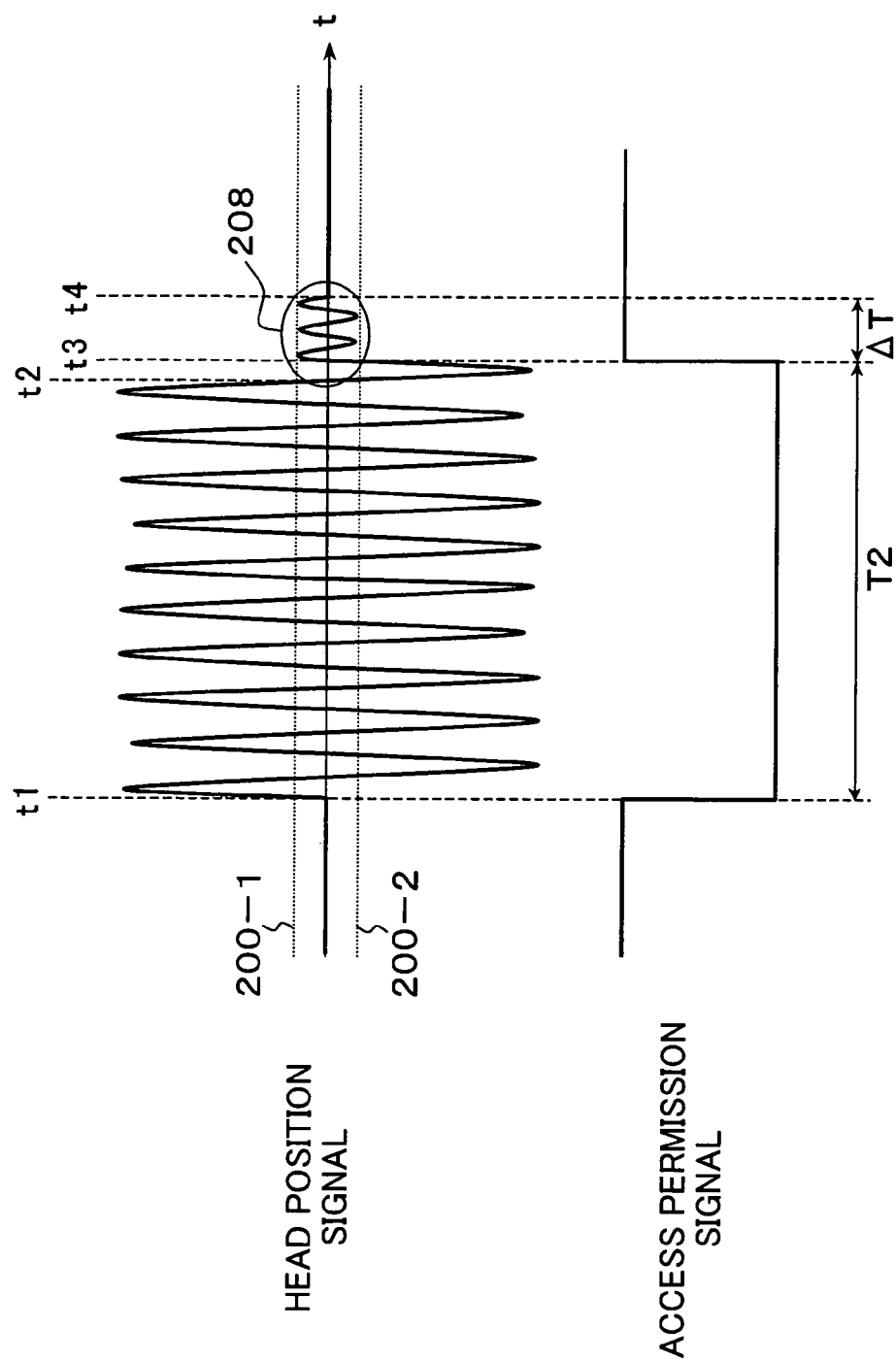
PRIOR ART
FIG. 3A
PRIOR ART
FIG. 3B

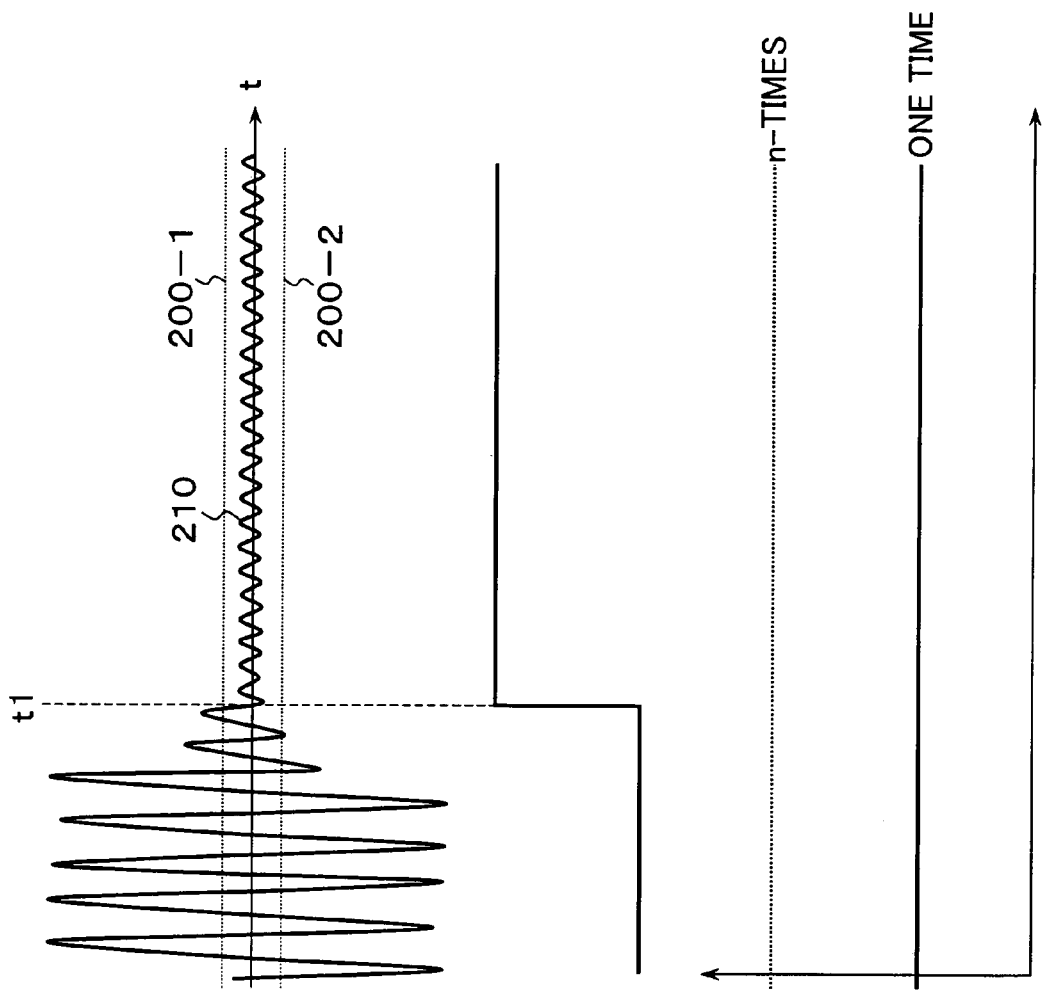

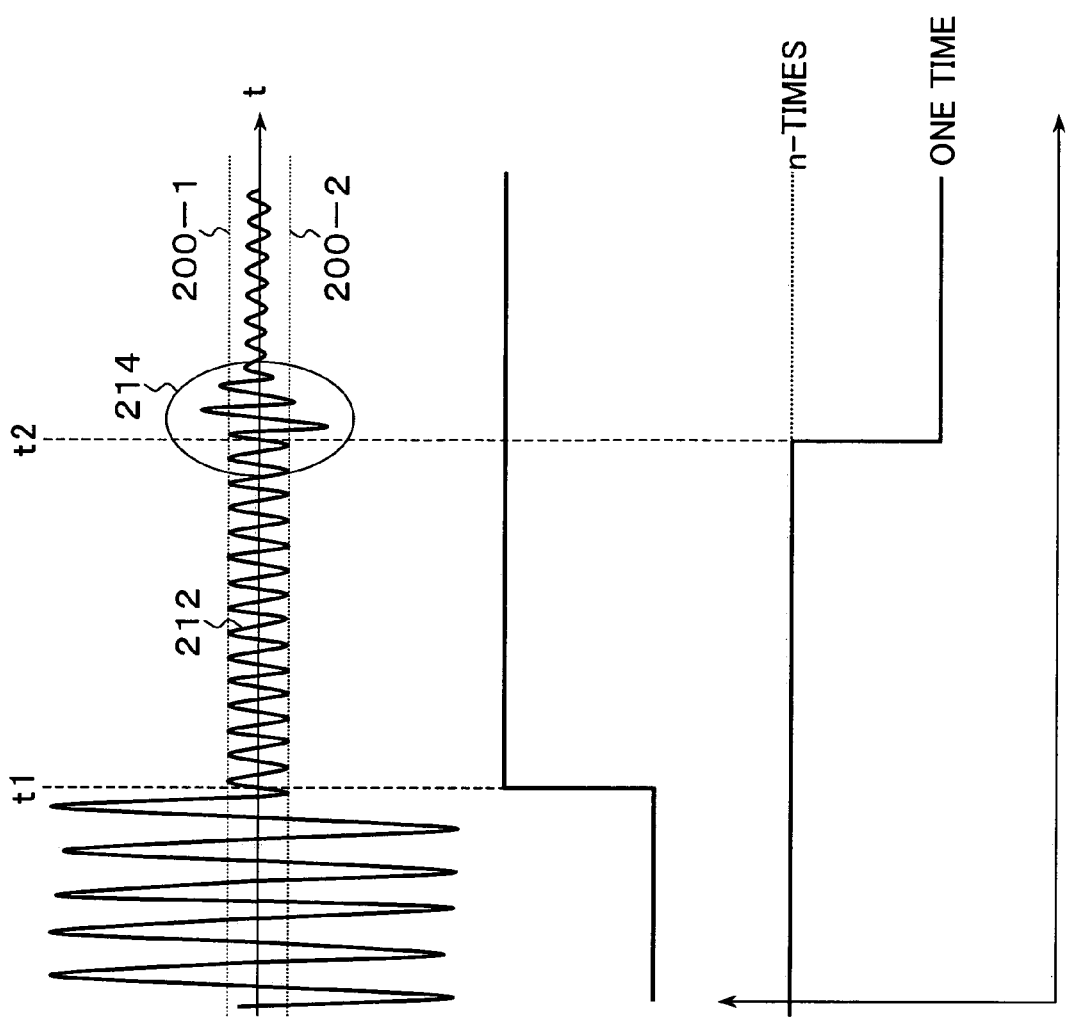

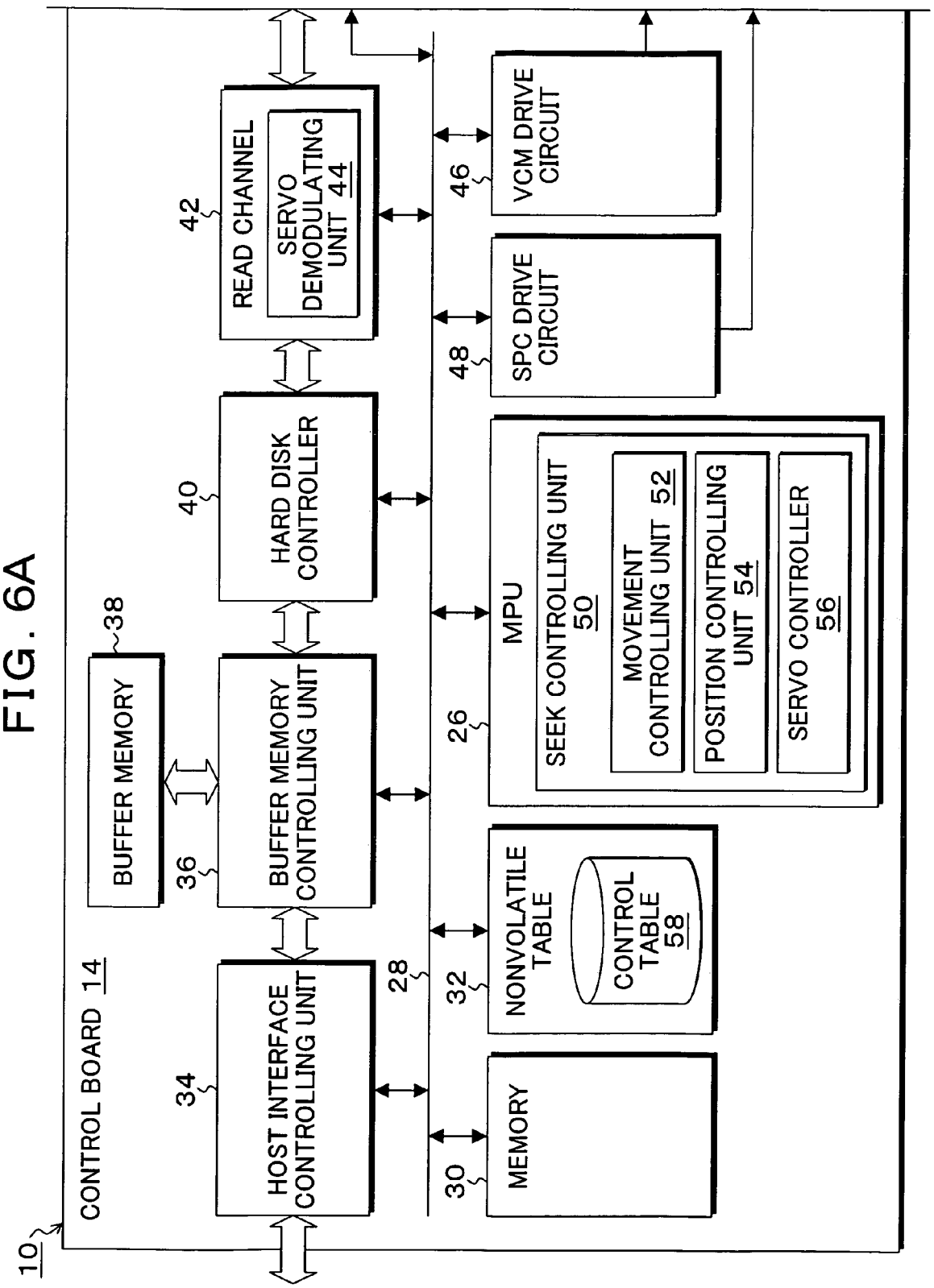
FIG. 6A

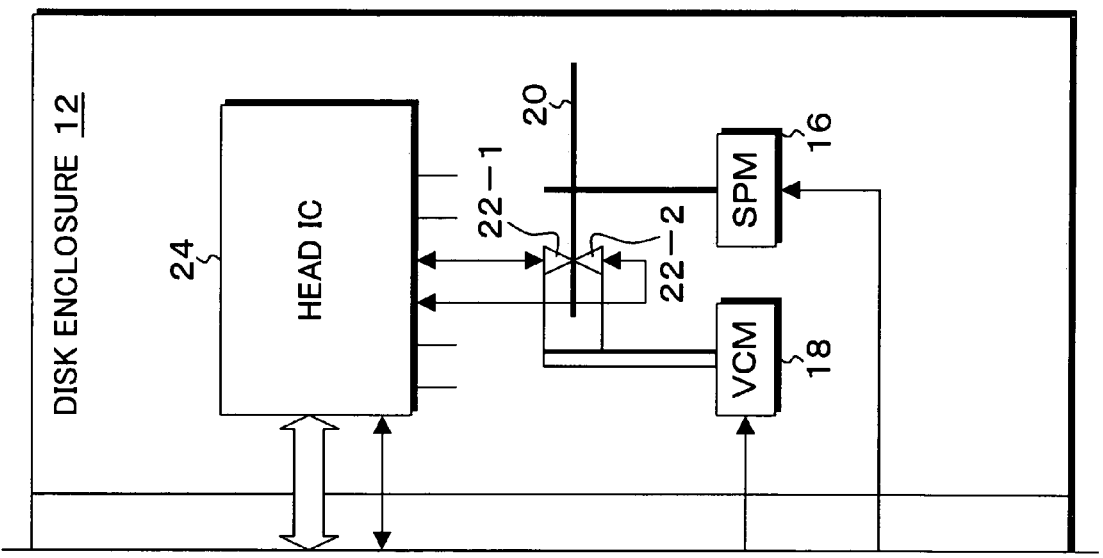

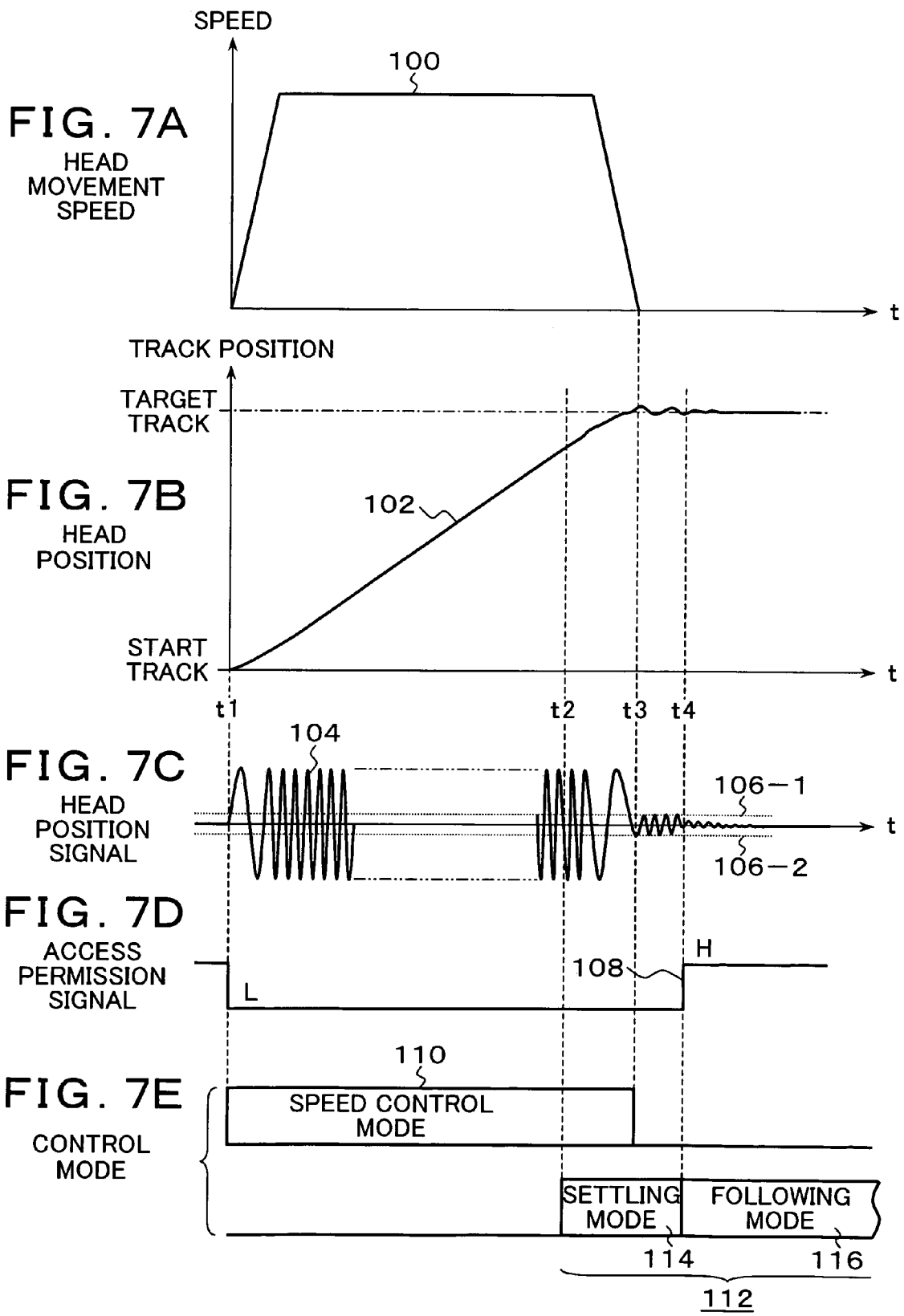

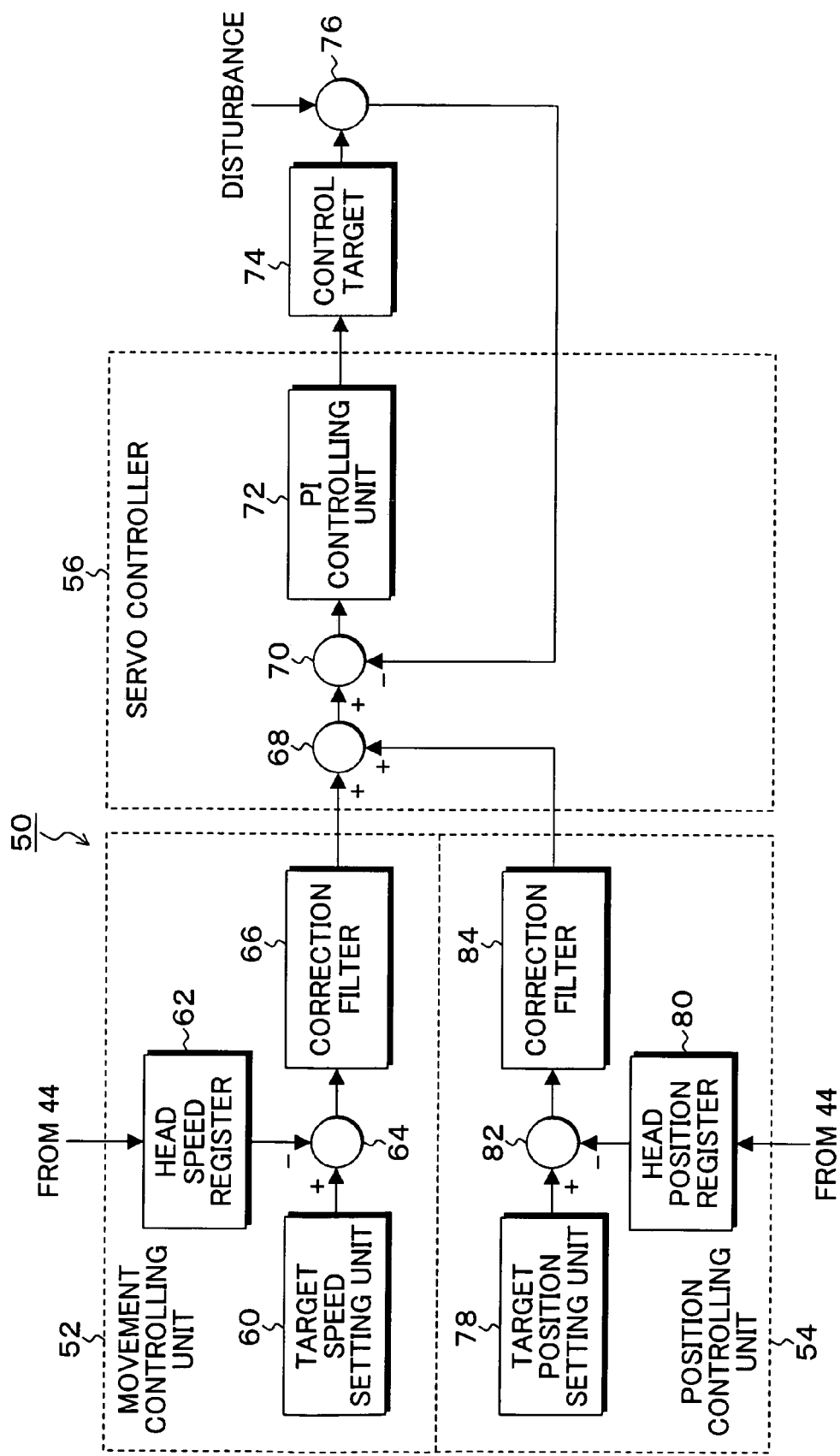
FIG. 8

FIG. 9
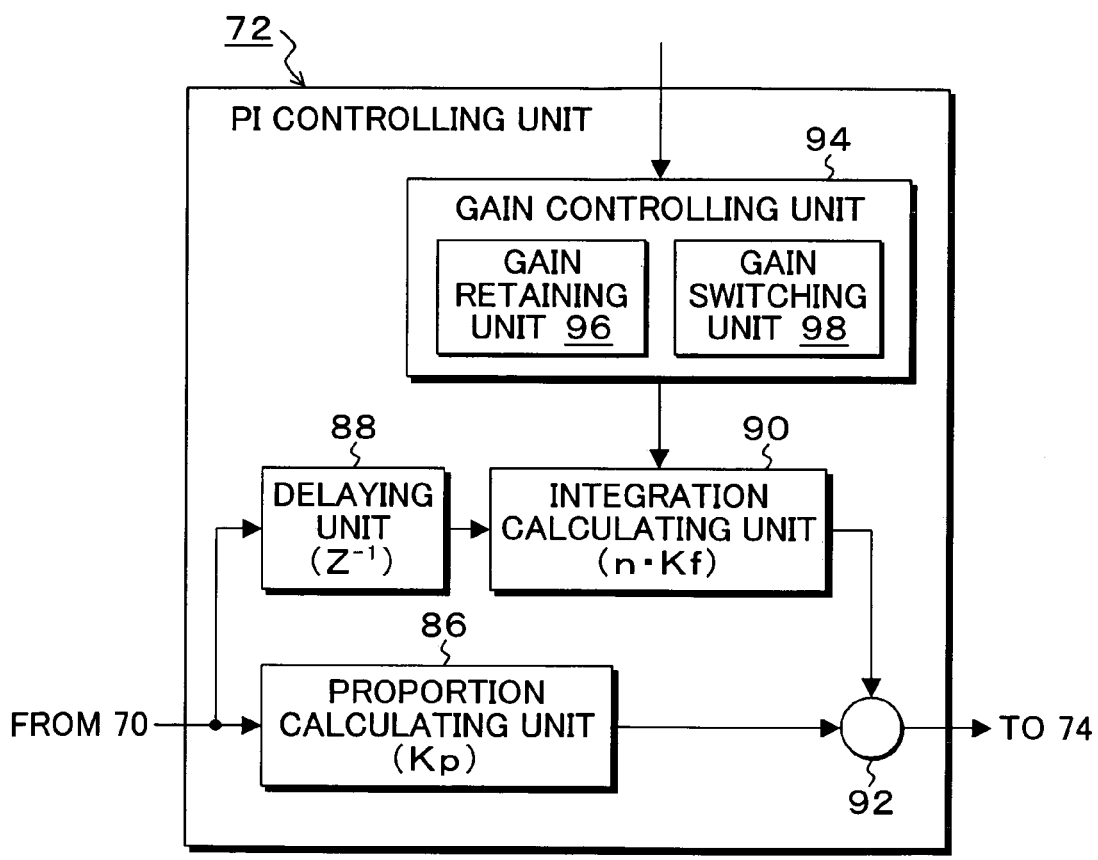

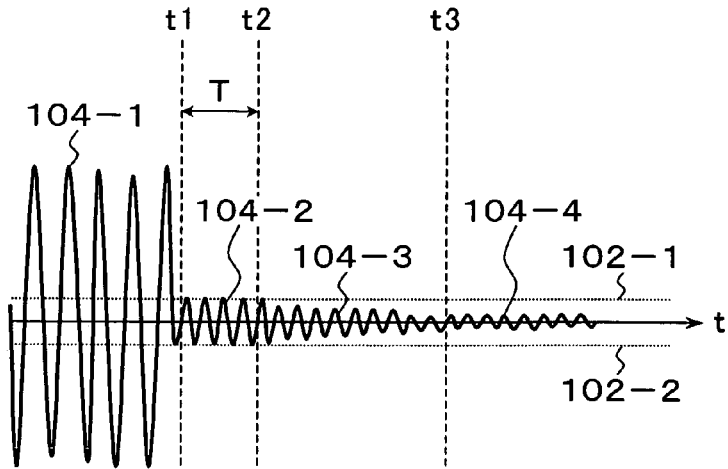
FIG. 10A
HEAD POSITION SIGNAL
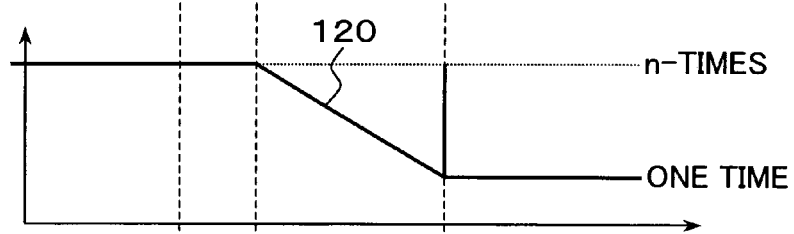
FIG. 10B
INTEGRAL GAIN
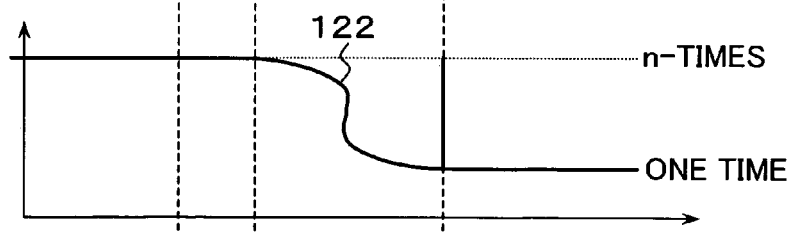
FIG. 10C
INTEGRAL GAIN
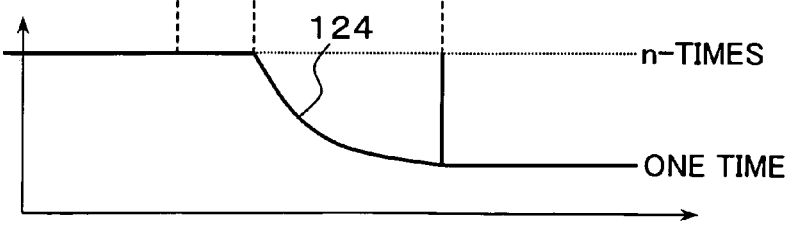
FIG. 10D
INTEGRAL GAIN FIG. 11
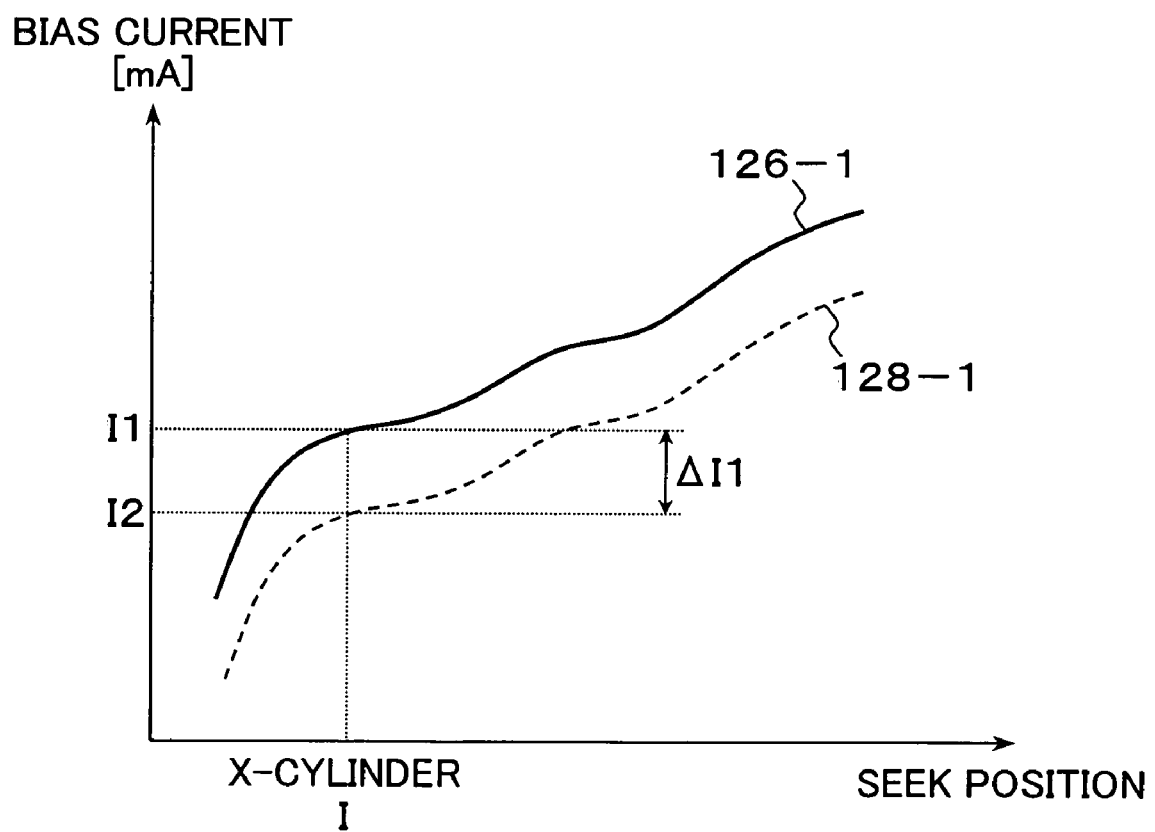

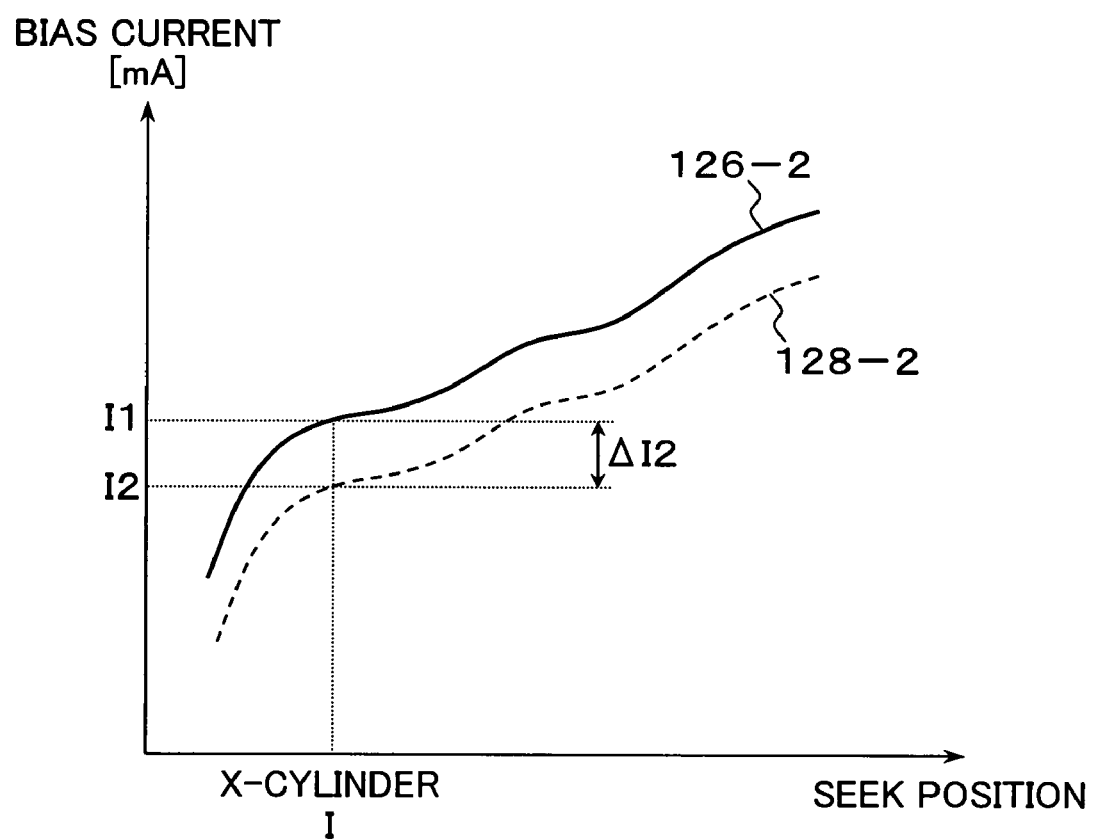
FIG. 12

FIG. 13
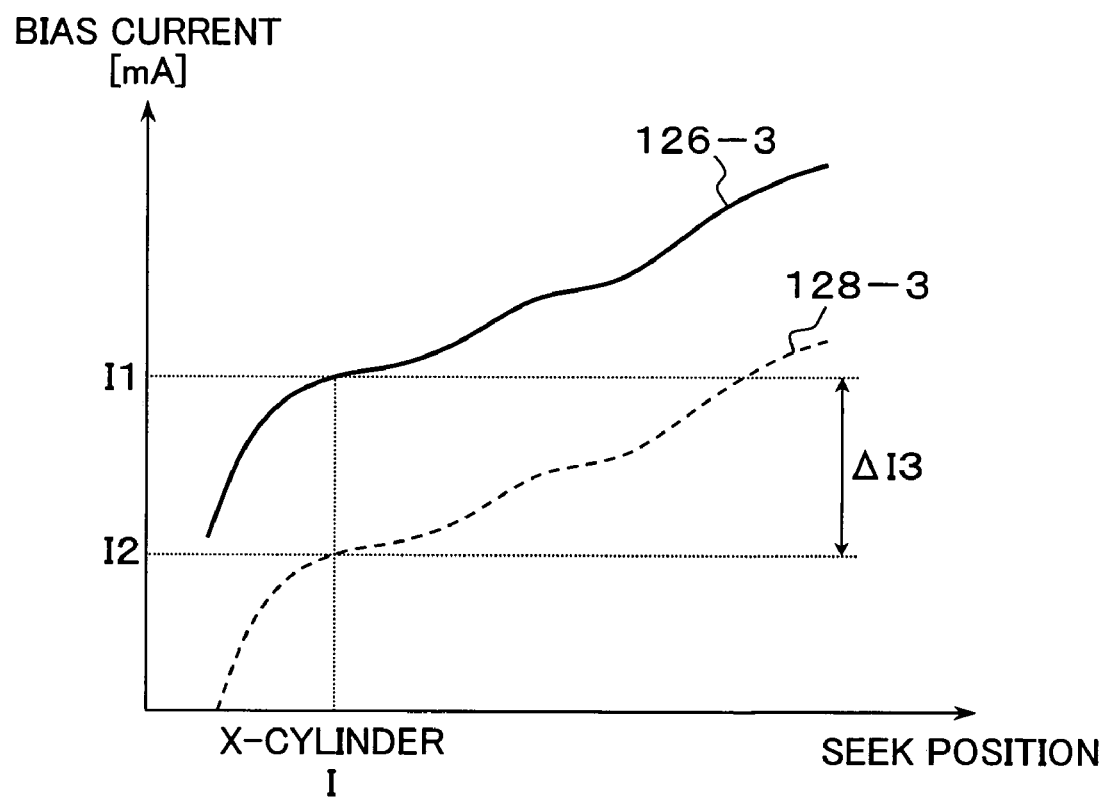

FIG. 14
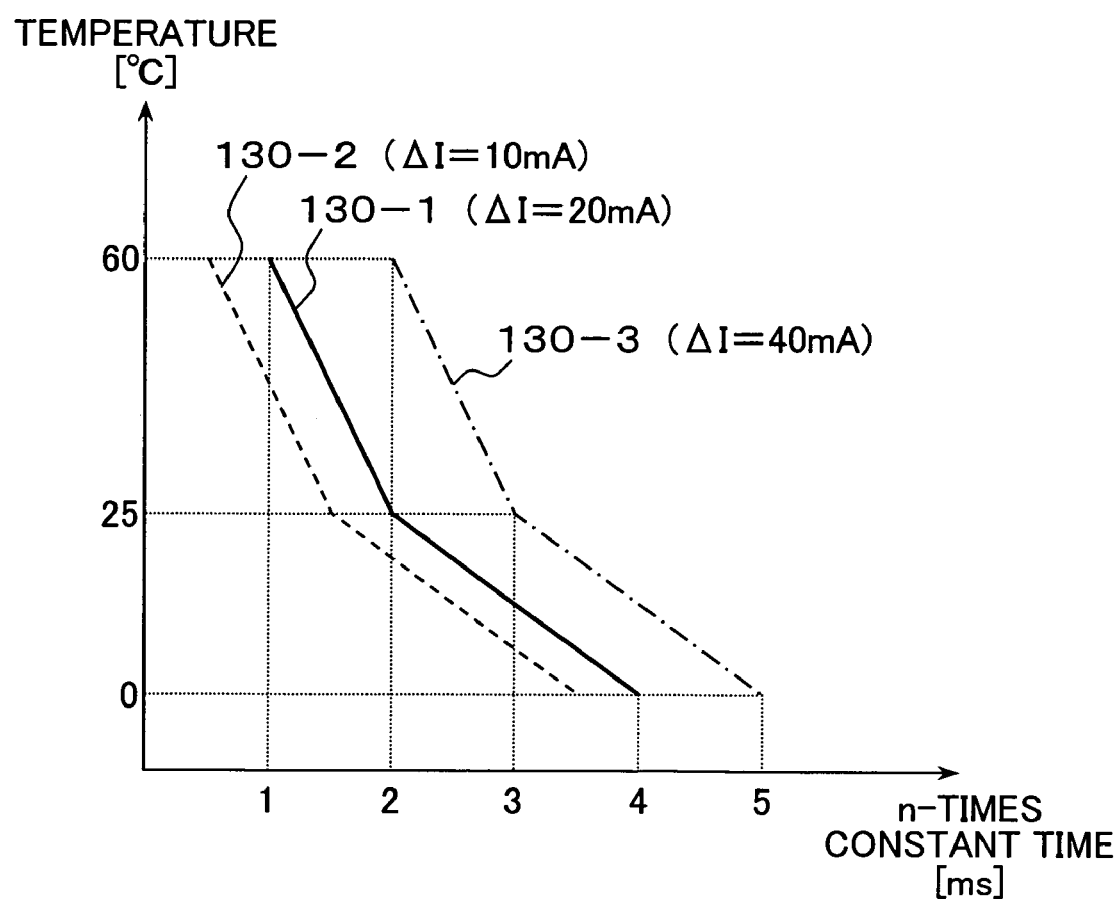

FIG. 15

| BIAS CURRENT DIFFERENCE ΔI (mA) | TEMPERATURE (°C) | RETENTION TIME (ms) |
|---|---|---|
| 10 | 00 | T11 |
| | 25 | T12 |
| | 60 | T13 |
| 20 | 00 | T21 |
| | 25 | T22 |
| | 60 | T23 |
| 40 | 00 | T31 |
| | 25 | T32 |
| | 60 | T33 |

FIG. 16A
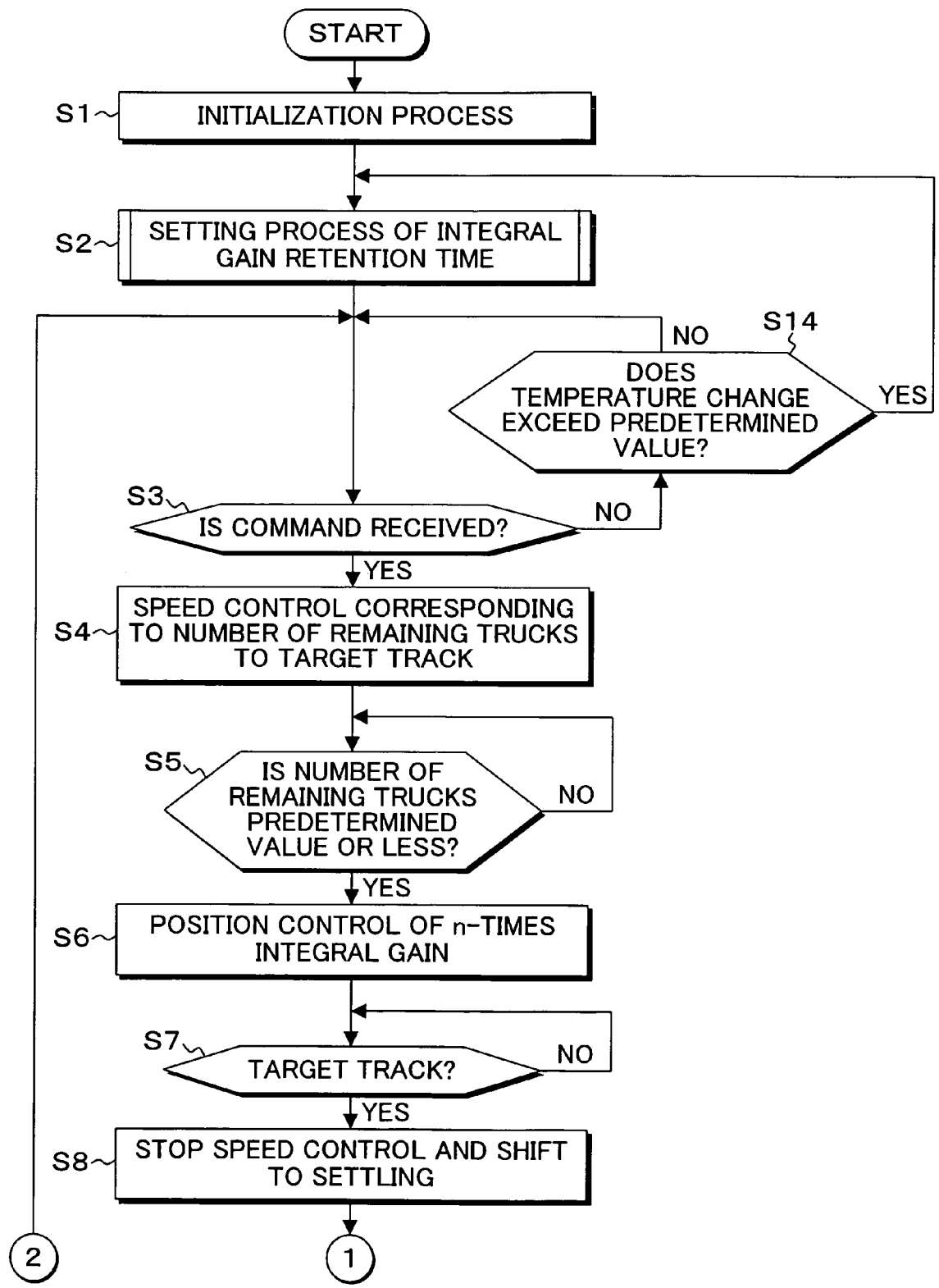

FIG. 16B
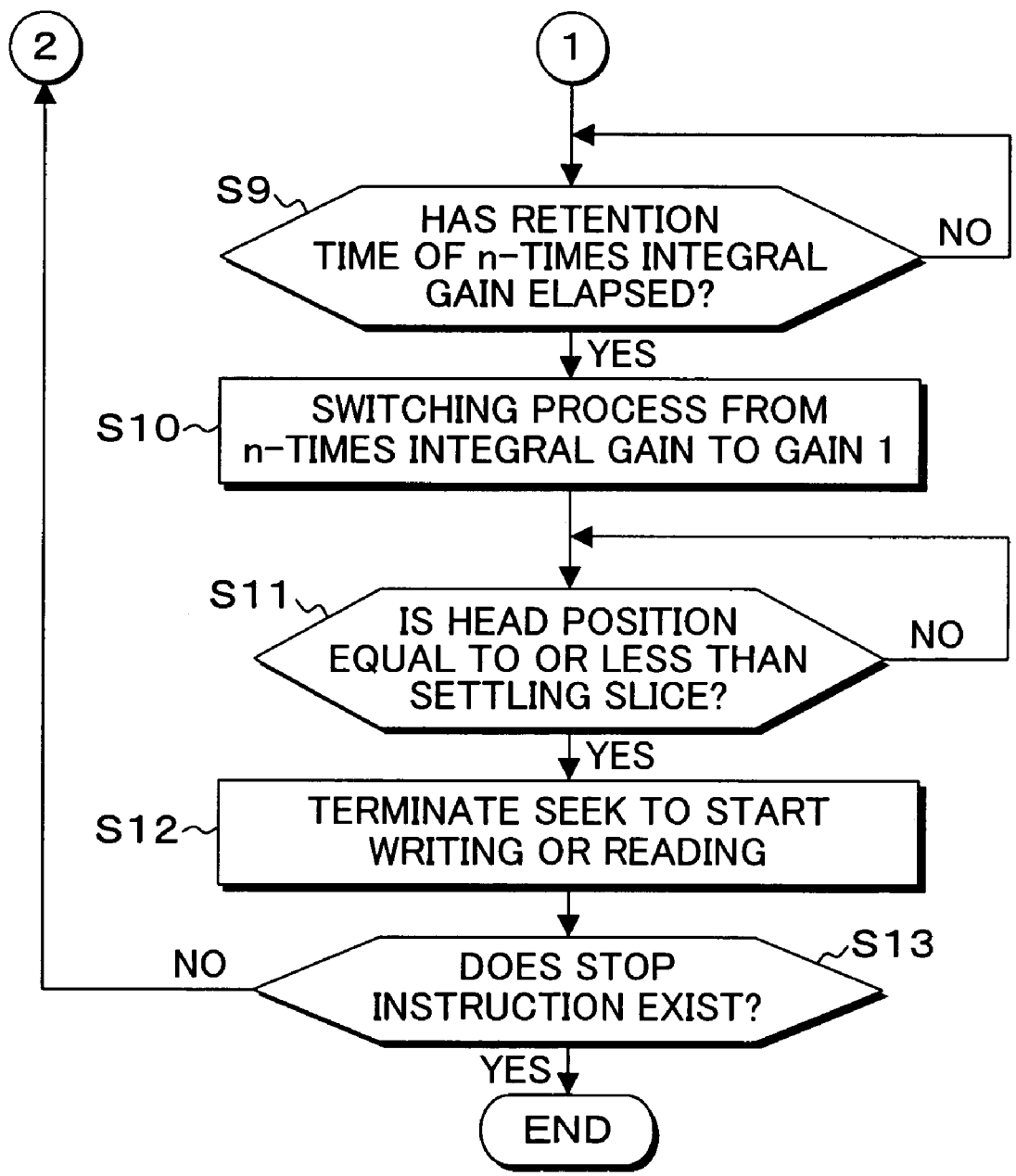

FIG. 17
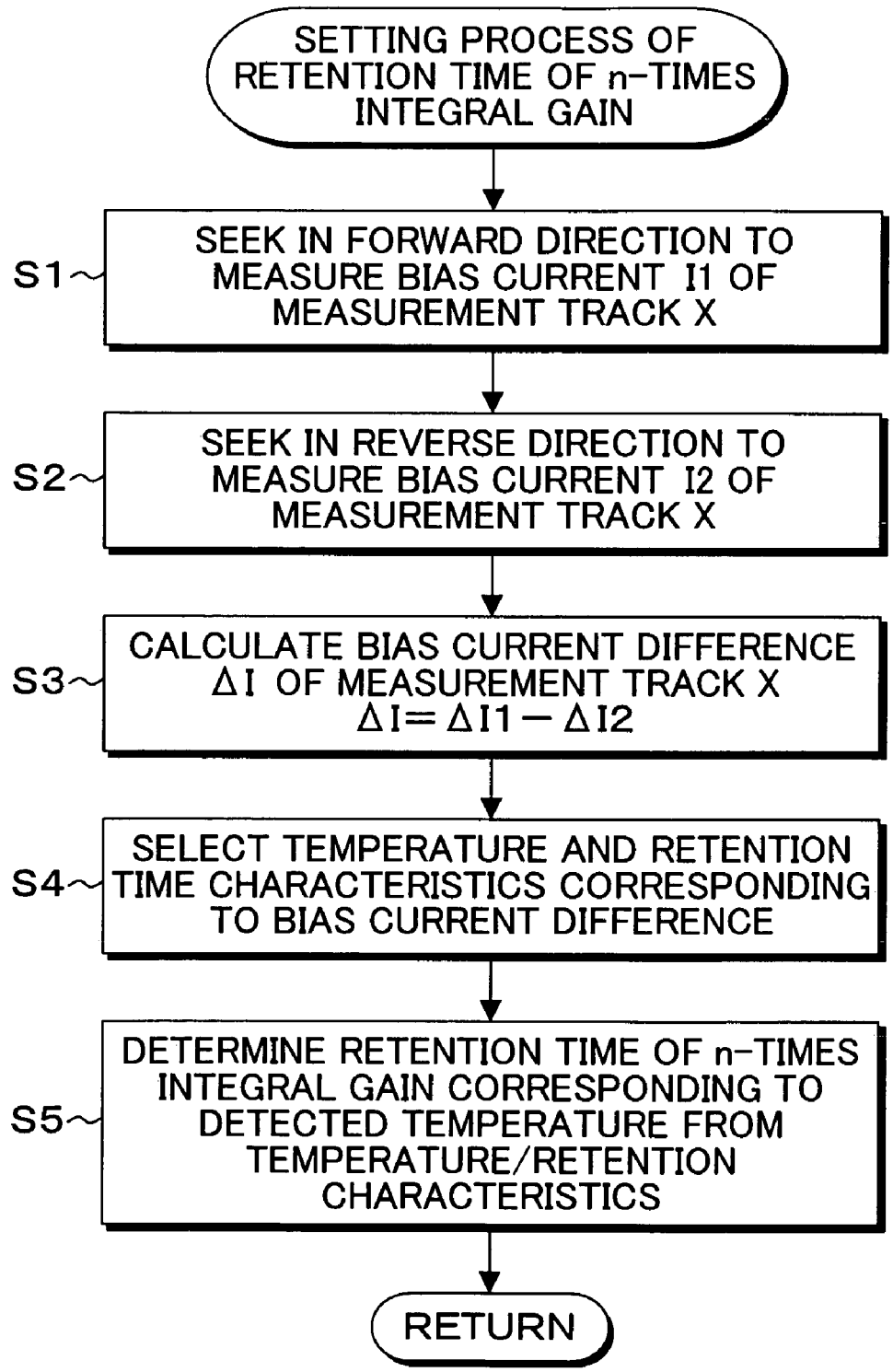

US 7,276,874 B2

1

STORAGE APPARATUS, SEEK CONTROL METHOD AND PROGRAM

CROSS-REFERENCE TO RELATED APPLICATION

This application is a priority based on prior application No. JP2006-026620 filed Feb. 3, 2006, in Japan.

BACKGROUND OF THE INVENTION

1. Field of the Invention

The present invention relates generally to a storage apparatus, seek control method and program that move a head to an arbitrary target track on a medium to perform writing or reading, and, more particularly, to a storage apparatus, seek control method and program that enhance a seek performance by reducing a settling time with a position control when the head arrives at the target track.

2. Description of the Related Art

Conventionally, in seek control of a magnetic disk apparatus, a target speed profile is generated based on the number of remaining tracks (track difference) relative to a target track to control a speed of a head actuator by driving with a voice coil motor; when the number of remaining tracks relative to the target track is reduced to a predetermined value, a position control is started to position a head to a track center; when arriving at the target track, the speed control is discontinued to enable only the position control; and if the head converges within a settling slice (settling threshold) defining a predetermined width centering on the track center within a predetermined settling time, an access permission signal is enabled to start a write operation or read operation for a disk medium. If the head does not converge within the settling slice within the settling time, since a seek error occurs when the settling time has elapsed and the seek control is retried, the seek time is prolonged and the performance is deteriorated. In such a conventional seek control, to reduce the remaining oscillations of the head when the head arrives at the target track and the position control is enabled, the settling time is extended in consideration of fluctuations of bias currents keeping the head actuator at the target track, which are caused by mechanical variations of a head driving mechanism and a seek distance.

FIGS. 1A and 1B show a behavior of a head position when switched to a conventional position control. FIG. 1A is a head position signal; the seek control is started at time t1; when arriving at the target track at time t2, the position control is enabled; the head position signal converges within a settling slice 200-1, 200-2 as shown by an oscillating waveform 202 at time t3; at this point of time, an access permission signal of FIG. 1B becomes H-level; and the reading or the writing can be performed for a disk medium. In this case, the seek time is T1. Due to the variations of the head driving mechanism and the seek distance, the head converges within the settling slice 200-1, 200-2 at time t4 with a substantial change as shown by an oscillating waveform 204, and the seek time is extended to T2 to generate a variation of ΔT. Therefore, conventionally, the seek times until the head converges within the settling slice are measured under various environmental conditions such as temperatures and voltages to set the settling time in anticipation of 6σ(=±3σ) of variation σ in a normal distribution of a multiplicity of the detected seek times, and since the settling slice itself is not narrow and has some margin, a performance of an apparatus has not been affected directly. However, recently, track pitches are narrowed considerably to

2 achieve higher density in tracks-per-inch (TPI) of a disk medium. Therefore, the settling slice is also narrowed considerably along with the higher track density. Consequently, the settling time is further extended to absorb variations of times until the convergence within the settling slice. However, since the seek time is prolonged and the performance is deteriorated if the settling time is extended, to converge the head position oscillations within a certain settling slice more quickly when switched to the position control without extending the settling time, an integral gain is increased in a proportional integral calculation used for the position calculation to allow the head to converge quickly within the settling slice.

FIGS. 2A and 2B show a behavior of a head position signal and an access permission signal when the multiplication constant of the integral gain of the position control is one; the seek control is started at time t1; when arriving at the target track at time t2, the position control is enabled to allow attenuation as shown by a waveform 206; the head position signal converges within the settling slice 200-1, 200-2 at time 4; and the access permission signal becomes H-level.

FIGS. 3A and 3B show a behavior of a head position signal and an access permission signal when the integral gain of the position control is increased n-times; the seek control is started at time t1; when arriving at the target track at time t2, the position control is enabled; rapid attenuation is achieved by increasing the integral gain as shown by a waveform 208; the head position signal converges within the settling slice 200-1, 200-2 at time 3; and the access permission signal becomes H-level. By increasing the integral gain in this way, the head can be quickly pulled in to the track center to reduce the variation anticipated conventionally and, as compared to the case that the integral gain is not increased as shown in FIGS. 2A and 2B, since the seek time can be T2 that is shorter than T1 by ΔT and the settling time is not needed to be extended, the performance is not deteriorated. Such a position control at the time of the settling includes patent documents 1 and 2, for example. The patent document 1 is a servo gain control method at the timer of the settling, which reduces the time for eliminating oscillations by repeating gain-down while determining the oscillations after gain-up. The patent document 2 is the settling determination, which calculates an oscillation component and an optimum settling time from a head movement speed and servo compensating means to achieve time reduction. However, in such a conventional method of reducing the seek time by increasing the integral gain, if the integral gain is increased as shown in FIGS. 5A to 5C, as compared to the waveform 210 when the integral gain is not increased as shown in FIGS. 4A to 4C, the fluctuations of the waveform 212 becomes greater after converging within the settling slice. In other words, if the integral gain is increased, the on-track accuracy to the target track is deteriorated after the seeking is completed.

In FIGS. 16 and 17A to 17C are the head position signals, access permission signals, and integral gains, respectively; the head position signals converge within the settling slice 200-1, 200-2 at time t1; and the access permission signals are raised to H-level. To eliminate the deterioration of the on-track accuracy due to the increase of the integral gain, as shown in FIGS. 5A to 5C, the integral gain must be restored to the original gain at the timing of time t2 during the track following control. However, if the integral gain is restored at time t2, the head position signal fluctuates wildly as shown by oscillations 214 and exceeds the settling slice 200-1, 200-2 to generate an off-track error, which causes a write error or read error during the writing or reading, and it is problematic that the access performance is reduced.

SUMMARY OF THE INVENTION

According to the present invention there is provided a storage apparatus, seek controlling method, a control apparatus and program that converge the remaining oscillations of the head position rapidly with the position control when arriving at the target track to improve the performance of the apparatus.

(Strage Apparatus)

The present invention provides a storage apparatus. The storage apparatus of the present invention comprises:

a movement controlling unit that performs movement control of a head toward a target track on a medium by driving a head actuator;

a position controlling unit that performs position control of the head actuator in accordance with proportional integral calculations such that a deviation of a head position relative to a track center is eliminated when the moving head arrives at the target track;

a gain retaining unit that retains an integral gain of the proportional integral calculations in an increased state during a predetermined retention time from the start of the control of the position controlling unit; and a gain switching unit that switches the increased integral gain smoothly to the original integral gain when the retention time has elapsed.

The gain switching unit reduces the increased integral gain linearly for switching to the original integral gain. The gain switching unit may reduce the increased integral gain smoothly at an earlier stage of a switching period, reduce drastically at a medium stage, and reduce smoothly at a later stage for switching to the original integral gain. The gain switching unit may reduce the increased integral gain exponentially for switching to the original integral gain. The gain retaining unit detects temperature to determine the retention time of the increased integral gain depending on the detected temperature. The gain retaining unit determines the retention time such that the retention time becomes longer when the temperature is lower and the retention time becomes shorter when the temperature is higher. The gain retaining unit includes a control table that stores the retention time correspondingly to each temperature within a service temperature range of the apparatus and wherein when temperature change exceeding a predetermined value is detected at the time of the activation of the apparatus or during the use of the apparatus, the retention time corresponding to the detected temperature is acquired and set from the control table. The control table stores characteristics of the retention time for each temperature within the service temperature range using a parameter that is a bias current difference between a bias current when the head actuator is driven in the forward direction and a bias current when the head actuator is driven in the reverse direction, and when temperature change exceeding a predetermined value is detected at the time of the activation of the apparatus or during the use of the apparatus, the gain retaining unit measures the bias current difference to select and use the characteristics of the retention time for each temperature within the service temperature range including the parameter of the detected bias current difference. The movement controlling unit performs the speed control of the head actuator depending on the number of remaining tracks from a track where the head is currently located to the target track and terminates the speed control with arrival at the target track, and the position controlling unit starts the position control in accordance with proportional integral calculations with the integral gain increased when the number of remaining tracks to the target track is reduced by the speed control to a predetermined value or less.

(Method)

The present invention provides a storage apparatus seek control method. The storage apparatus seek control method of the present invention comprises:

a movement controlling step of performing movement control of a head toward a target track on a medium by driving a head actuator;

a position controlling step of performing position control of the head actuator in accordance with proportional integral calculations such that a deviation of a head position relative to a track center is eliminated when the moving head arrives at the target track;

a gain retaining step of retaining an integral gain of the proportional integral calculations in an increased state during a predetermined retention time from the start of the position control of the position controlling step; and a gain switching step of switching the increased integral gain smoothly to the original integral gain when the retention time has elapsed.

(Control Apparatus)

The present invention provides a control apparatus. The control apparatus of the present invention comprises:

a movement controlling unit that performs movement control of a head toward a target track on a medium by driving a head actuator;

a position controlling unit that performs position control of the head actuator in accordance with proportional integral calculations such that a deviation of a head position relative to a track center is eliminated when the moving head arrives at the target track;

a gain retaining unit that retains an integral gain of the proportional integral calculations in an increased state during a predetermined retention time from the start of the control of the position controlling unit; and a gain switching unit that switches the increased integral gain smoothly to the original integral gain when the retention time has elapsed.

(Program)

The present invention provides a seek control program executed by a computer of a storage apparatus. The seek control program of the present invention drives the computer of the storage apparatus to execute:

a movement controlling step of performing movement control of a head toward a target track on a medium by driving a head actuator;

a position controlling step of performing position control of the head actuator in accordance with proportional integral calculations such that a deviation of a head position relative to a track center is eliminated when the moving head arrives at the target track;

a gain retaining step of retaining an integral gain of the proportional integral calculations in an increased state during a predetermined retention time from the start of the position control of the position controlling step; and a gain switching step of switching the increased integral gain smoothly to the original integral gain when the retention time has elapsed.

According to the present invention, when the head is moved to the target track with the seek control to enable the position control, the head is rapidly pulled in to the track center to converge the remaining oscillations by increasing the integral gain used in the proportional integral calculation of the position control; by smoothly restoring the integral gain while the remaining oscillations are converged, the integral gain is restored without considerable fluctuations of the head position associated with the switch-over of the integral gain; and the fluctuations of the head position in the track following control can be constrained to ensure a track following accuracy. By optimizing the retention time for retaining the increased integral gain depending on temperatures, the fluctuations are reduced when the head is moved to the target track to start the position control under various environmental conditions including temperatures; variations are constrained in the time for converging within the settling slice that has a constant threshold width set to the track center for permitting a write or read access; since the settling time is not needed to be extended, the seek time is not prolonged; if the width of the settling slice is narrowed by achieving higher density in the tracks-per-inch, the seek performance can be maintained. Although in a typical countermeasure to the remaining oscillations at the time of pulling in to the track in the seek control, the head actuator is made of an expensive material, etc. which have fewer variations in the bias current due to the changes in temperature, the present invention can be achieved only by the integral gain switching control that increases and smoothly restores the integral gain of the proportional integral control when the head is pulled in to the target track, which is advantageous since costs are not increased. Although the head actuator has mechanical manufacturing variations, which cause changes in the bias current of the head actuator relative to the track position, since characteristics of the retention time for increasing the integral time relative to temperatures are prepared in a control table correspondingly to the bias current specific to the apparatus to perform the position control with the integral gain increased with the use of the retention time optimized depending on temperatures, the constraint of the remaining oscillations can be optimized in the position control without the effect of the mechanical variations of the head actuator.

The above and other objects, features and advantages of the present invention will become more apparent from the following detailed description with reference to the drawings.

BRIEF DESCRIPTION OF THE DRAWINGS

FIGS. 1A and 1B are time charts of a behavior of the head position signal and the access permission signal before converging within the settling slice in the conventional position control;

FIGS. 2A and 2B are time charts of a behavior of the head position signal and the access permission signal when the integral gain of the position control is one;

FIGS. 3A and 3B are time charts of a behavior of the head position signal and the access permission signal when the integral gain of the position control is multiplied by n;

FIGS. 4A to 4C are time charts of a behavior of the head position signal and the access permission signal when the integral gain of the position control is one in the track following control;

FIGS. 5A to 5C are time charts of a behavior of the head position signal and the access permission signal when the integral gain is switched to one during the track following control after the integral gain of the position control is multiplied by n;

FIGS. 6A and 6B are block diagrams of the embodiment of the magnetic disk apparatus according to the present invention;

FIGS. 7A to 7E are time charts of the seek control according to the embodiment of FIGS. 6A and 6B;

FIG. 8 is a block diagram of a functional configuration of the seek control according to the embodiment of FIGS. 6A and 6B;

FIG. 9 is a block diagram of details of the PI controlling unit of FIG. 8;

FIGS. 10A to 10D are explanatory diagrams of the integral gain switching control according to the embodiment;

FIG. 11 is an explanatory diagram of the bias current measurement result of the head actuator measured in the room temperature environment;

FIG. 12 is an explanatory diagram of the bias current measurement result of the head actuator measured in the high temperature environment;

FIG. 13 is an explanatory diagram of the bias current measurement result of the head actuator measured in the low temperature environment;

FIG. 14 is a characteristic diagram of a relationship between temperature and the retention time with the integral gain increased using a parameter of the bias current difference;

FIG. 15 is an explanatory diagram of the control table provided in the embodiment of FIGS. 6A and 6B;

FIGS. 16A and 16B are flowcharts of the seek control according to the embodiment of FIGS. 6A and 6B; and FIG. 17 is a flowchart of details of the setting process of the retention time with integral gain increased at step S2 of FIGS. 16A and 16B.

DETAILED DESCRIPTION OF THE PREFERRED EMBODIMENTS

FIGS. 6A and 6B are block diagrams of an embodiment of a magnetic disk apparatus to which the present invention is applied. In FIGS. 6A and 6B, a magnetic disk apparatus 10 is known as a hard disk drive (HDD) and is constituted by a disk enclosure 12 and a control board 14. The disk enclosure 12 is provided with a spindle motor (SPM) 16, and a magnetic disk medium 20 is mounted to the rotation shaft of the spindle motor and is rotated at a constant rotation speed, for example, 5400 rpm. The disk enclosure 12 is provided with a voice coil motor (VCM) 18, and the voice coil motor (VCM) 18 is equipped with heads 22-1, 22-2 at ends of arms of a head actuator and positions the head to a recording surface of the magnetic disk medium. The heads 22-1, 22-2 are equipped with a write head and a read head integrally. A plurality of the disk mediums may exist as needed and the heads are increased depending on the increase in the number of the disk mediums. The heads 22-1, 22-2 are connected to a head IC with signal lines, and the head IC selects one head with a head select signal based on a write command or read command from a host that is a higher-level apparatus to perform writing or reading. The head IC is provided with a write amplifier for a write system and a pre-amplifier for a read system. The control board is provided with a MPU 26, and a bus 28 of the MPU 26 is provided with a memory 30 for deploying a control program and storing control data with the use of RAM and a nonvolatile memory 32 for storing a control program that acts as firmware with the use of FROM. The bus 28 of the MPU 26 is provided with a host interface controlling unit 34, a buffer memory controlling unit 36 that controls a buffer memory 38, a hard disk controller 40 that includes a function of a format controlling unit, a read channel 42 that acts as a write demodulating unit and a read demodulating unit, a VCM driving circuit 46, and a SPM driving circuit 48. The read channel 42 is provided with a servo demodulating unit 44, demodulates a head position signal from a reading signal of servo information recorded at constant intervals in the track direction of the recording surface of the disk medium, and demodulates a head movement speed from time changes in the head position signal. The MPU 26 is provided with a seek controlling unit 50 that is a function achieved by a program control, and the seek controlling unit 50 is constituted by a movement controlling unit 52, a position controlling unit 54, and a servo controller 56. The movement controlling unit 52 controls the movement of the heads 22-1, 22-2 to a target track on the magnetic disk medium 20 by driving the head actuator with the VCM 18. The position controlling unit 54 controls the position of the head actuator by driving the VCM 18 with proportional integral calculations such that a deviation from the head position relative to the track center is eliminated when the moving heads 22-1, 22-2 arrive at the target track. The servo controller 56 inputs signals depending on a speed deviation from the movement controlling unit 52 or a position deviation from the position controlling unit 54 to perform the proportional integral calculations, converts an output signal to a current signal with the VCM driving circuit 46, and applies a drive current to the VCM 18 to perform the speed control or position control. In this embodiment, the servo controller 56 performs the proportional integral calculations necessary for both the movement controlling unit 52 and the position controlling unit 54. In the proportional integral calculations at the time of the position control of the servo controller 56, the integral gain is increased when the head position arrives at the target track and the position control is started; the position control is performed with the integral gain increased for a predetermined retention time from the position control; and after the retention time has elapsed, the increased integral gain is switched smoothly to the original integral gain. The operation of the magnetic disk apparatus 10 will be described as follows. When the host interface controlling unit 34 receives the write command and the write data from the host, the write command is decoded by MPU 26 to recognize the target track; the seek controlling unit 50 is operated; and the seek controlling unit 50 starts the seek control that moves the head from a current position to the target track indicated by the write command.

The seek control is as shown in a time chart of FIGS. 7A to 7E. FIG. 7A shows a head movement speed; FIG. 7B shows a head position; FIG. 7C shows a head position signal; FIG. 7D shows an access permission signal; and FIG. 7E shows a control mode. In FIGS. 7A to 7E, when the seek control is started at time t1, the movement controlling unit 52 generates a target speed profile composed of speed-up, constant-speed, and slow-down based on the number of remaining tracks (track difference) to the target track; the speed control including the proportional integral calculations is performed such that the deviation becomes zero between the actually detected head movement speed and the target speed; and the speed control is performed as shown by the head movement speed 100 shown in FIG. 7A. Correspondingly, as shown in FIG. 7B, the head position moves from a start track to the target track as indicated by a head movement trace 102. While the head is moving with the speed control, as shown in FIG. 7C, the head position signal is acquired as an oscillating signal that changes with a constant oscillation every time a track is passed over. The access permission signal of FIG. 7D is L-level and is in a forbidden sate until the head arrives at and pulled in to the target track. When the head arrives at the target track with the speed control at time t3, the speed control of the movement controlling unit 52 is terminated. Therefore, a speed control mode 100 is a section from the start of the seeking at time t1 to the arrival at the target track at time t3. In this embodiment, the position controlling unit 5 is operated at time t2 when the head is located at a predetermined track before the head arrives at the target track at time t3, the position control is enabled at time t3 by terminating the speed control when the head arrives at the target track at time t3. When the position control is operated at time t2, in this embodiment, the integral gain of the proportional integral calculations of the position control is increased. Therefore, when the position control is enabled by terminating the speed control at time t3, the integral gain of the position control has been increased at this point of time. In the position control, a gain control is performed such that the integral gain is maintained in the increased state from start time t3 for a predetermined retention time and is then restored smoothly to the original integral gain. With the position control from time t3, as shown in FIG. 7C, the head position signal converges within a preset settling slice 106-1, 106-2 that has a predetermined oscillation range relative to the track center at time t4, and the access permission signal 108 is changed from L-level to H-level at this point of time to permit the writing operation based on the write command for the target track. A settling mode 114 is a section from the start of the position control at time t2 until the head position signal converges within the settling slice 106-1, 106-2, and after time t4, control of a following mode 116 is performed for making the head follow the target track's track center. The settling mode 114 and the following mode 116 constitute a position control mode 112. The settling mode 114 is substantially started when the speed control is terminated at time t3. When the seek controller 50 positions the head at the target track and the access permission signal becomes H-level to permit the access, the writing is performed to a sector instructed by the command of the write data. In this writing operation, since the buffer memory 38 stores the write data received along with the write command, the write data is converted to a predetermined data format with a format control function of the hard disk controller 40; ECC codes are added by an ECC process; the scramble-RLL code conversion and writing compensation are performed by the write modulation system of the read channel 42 and the data is written into the magnetic disk medium 20 from the write head of, for example, the selected head 2-1 via the write amplifier built into the head IC 24. On the other hand, if the host interface controlling unit 34 receives the read command from the host, the head is moved and positioned at the target track by the seek controlling unit 50 based on the decoding of the read command as is the case with the write commend; the preamplifier amplifies a read signal read from the read head selected by the head selection of the head IC 24; the read signal is input into the read demodulation system of the read channel 42 to demodulate the read data with partial response maximum likelihood detection (PRML), etc.; errors are detected and corrected by performing the ECC process with the hard disk controller 40; and the read data is buffered into the buffer memory 38 and transferred from the host interface controlling unit 34 to the host.

FIG. 8 is a block diagram of a functional configuration of the seek controlling unit 50 in the embodiment of FIGS. 6A and 6B. In FIG. 8, the seek controlling unit 50 is constituted by the movement controlling unit 52, the position controlling unit 54, and the servo controller 56. The movement controlling unit 52 is provided with a target speed setting unit 60, a head speed register 62, an adding unit 64, and a correction filter 66. At the time of the seek control, a track difference to the target track is supplied to the target speed setting unit 60, and the target speed setting unit 60 generates the target speed profile depending on the track difference for the adding unit 64. With regard to the target speed profile, if the track difference to the target track is large, the target speed profile composed of speed-up, constant-speed, and slow-down is generated, and if the track difference is small, a speed-up/slow-down profile are generated without a constant-speed section. In the case of one-track seeking that seeks an adjacent track, a predetermined drive pattern is used instead of the speed control. The head speed register 62 stores a head speed in real time, which is acquired by differentiating the head position signal demodulated by the servo demodulating unit 44 provided in the read channel 42 of FIGS. 6A and 6B. Therefore, the adding unit 64 outputs a speed deviation between the target speed and the head speed and, after desired correction is performed by the correction filter 66, a corrected speed deviation signal is output to the servo controller 56. The servo controller 56 is provided with adding units 68, 70 and a PI controlling unit (proportional integral controlling unit) 72. The speed deviation signal from the movement controlling unit 52 is input via the adding units 68, 70 to the PI controlling unit 72, and a control signal for the deviation control is acquired by performing PI calculations including multiplication of proportional components and addition of integral components and is output to a control target 74. The control target 74 is the head actuator that moves the VCM 18 and the heads 22-1, 22-2 provided in the disk enclosure relative to the disk medium 20. The result of the speed control of the control target 74 is detected from the adding unit 76 and is fed back to the adding unit 70, and the servo controller 56 performs feed-forward control such that a deviation becomes zero between the deviation signal of the servo controller 56 and the feedback signal from the adding unit 76. On the other hand, the position controlling unit 54 is provided with a target position setting unit 78, a head position register 80, an adding unit 82, and a correction filter 84. As shown in the control mode of FIG. 7E, the position controlling unit 54 is operated by the speed control at a predetermined track before the target track; the target position setting unit 78 outputs to the adding unit 82 a target position signal of a zero position indicating the track center to pick up for the head position register 80 a position deviation from the head position acquired from the servo demodulating unit 44 provided in the read channel 42 of FIGS. 6A and 6B, and after desired correction is performed by the correction filter 84, a position deviation signal is output to the servo controller 56. In the servo controller 56, the speed deviation signal and the position deviation signal are added by the adding unit 68 and are input from the adding unit 70 to the PI controlling unit from a predetermined track before the target track of the speed control, and the speed control and the position control are performed concurrently in a portion before arriving at the target track. When the head arrives at the target track, the speed control of the movement controlling unit 52 is stopped and only the position deviation signal is input from the position controlling unit 54 to the servo controller 56 to switch to the position control only.

FIG. 9 is a block diagram of details of the PI controlling unit of FIG. 8. The PI controlling unit 72 of FIG. 9 is constituted by a proportion calculating unit 86, a delaying unit 88, an integration calculating unit 90, and an adding unit 92. A gain control unit 94 is provided for the integration calculating unit 90 and the gain controlling unit 94 is provided with a gain retaining unit 96 and a gain switching unit 98. The proportion calculating unit 86 multiplies the input signal by a proportional gain Kp and outputs the signal to the adding unit 92. Concurrently, integration calculating unit 90 multiplies an input signal delayed one sampling time by the delaying unit by an integral gain Kf and this signal is added to the signal from the proportion calculating unit 86 by the adding unit 92. A transfer function of the proportional integral calculation in the PI controlling unit 72 is as follows.

$$Kp+Kf(1+s)$$

The gain retaining unit 96 provided in the gain controlling unit 94 retains the integral gain of the integration calculating unit 90 in an increased state for a predetermined retention time T from when the position control is started by terminating the speed control. If the normal integral gain is Kf, the integral gain is increased to the n-times integral gain (n·Kf) during the retention time from the start of the position control. The gain switching unit 98 performs gain switch-over by smoothly switching the n-times integral gain Kf to the original one-time integral gain after the end of the retention time for increasing the integral gain to the n-times integral gain with the gain retaining unit 96.

FIGS. 10A to 10D are explanatory diagrams of the gain switching control of the gain switching unit 98 according to the embodiment. FIG. 10A shows a behavior of a head position signal 104 when the head is moved by the speed control to the target track and arrives at the target track at time t1 to terminate the speed control and correspondingly enables the position control started before then. The embodiment of the integral gain switch-over of the present invention includes the following three switching modes, for example.

(1) In a mode 1, the n-times integral gain is reduced linearly for switching to the original one-time integral gain.

(2) In a mode 2, the n-times integral gain is reduced smoothly at an earlier stage of a switching period, reduced drastically at a medium stage, and reduced smoothly at a later stage for switching to the original one-time integral gain.

(3) In a mode 3, the n-times integral gain is reduced exponentially for switching to the original one-time integral gain.

FIG. 10B is the integral gain switch-over in the mode 1; at time t1, the position control is performed using the n-times integral gain for the convergence within the settling slice 102-1, 102-2 as is the case with the head position signal 104-2 of FIG. 10A; and after the predetermined retention time T has elapsed, the n-times integral gain is reduced at time t2 to the one-time integral gain at a constant rate as shown by a line 120. In this gain switch-over of the mode 1, since the integral gain is reduced from the n-times gain to the one-time gain when the retention time T has elapsed, the drastic fluctuations of the gain is constrained at each edge portion of time 2 when the reduction is started from the n-times portion and time t3 when the constant rate is changed to one-time portion as shown by the head position signal 104-3 of FIG. 10A, and the track following accuracy can be enhanced as shown by the head position signal 104-4.

FIG. 10C is the integral gain switch-over in the mode 2; the gain switching period from time t2 to time t3 is divided to an earlier stage, a medium stage, and a later stage; and in the earlier stage when the gain switch-over is started, the gain changing rate is lowered to constrain the considerable fluctuations of the gain at the start of the gain switch-over. Similarly, the gain changing rate is lowered at the later stage to constrain the gain fluctuation when the gain is shifted to the one-time gain at time t3. On the other hand, the changing rate is increased at the medium stage to reduce the gain sufficiently. Consequently, the gain switch-over of an almost S-shaped curve 122 is performed smoothly in the mode 2. FIG. 10D is the integral gain switch-over in the mode 3; the n-times integral gain is changed to the one-time integral gain along an exponential curve; although the changing rate is high at the starting point of time t2, the changing rate is then decreased exponentially to constrain oscillations appearing in the head position signal due to the gain switch-over; and by restoring the integral gain to one, the oscillation amplitude can be constrained such that the tracking accuracy is enhanced in the track following control. By maintaining the switching characteristics of each integral gain of the modes 1 to 3 shown in FIGS. 5B to 5D in a memory as discrete data acquired by temporally sampling the line 120 and the curves 122, 124, the gain switch-over can be performed for each predetermined sampling period to switch the integral gain from the n-times gain to the one-time gain. Of course, the switch-over of the integral gain is not limited to the modes 1 to 3 of FIGS. 10A to 10D, and any gain switch-over profiles may be used as long as the gain switch-over can switch the integral gain from the n-times gain to the one-time gain without fluctuating the amplitude of the head position signal considerably. Description will be made of the retention time for retaining the integral gain in the increased state when the position control is started. In the position control of FIGS. 10A to 10D, the retention time T for increasing the integral gain n-times from time t1 to time t2 can be optimized depending on service temperatures of the magnetic disk apparatus. The retention time T for increasing the integral gain is dependent on the mechanical bias characteristics of the head actuator at each temperature. With regard to the mechanical bias characteristics of the head actuator, to cancel the mechanical bias when the head actuator is moved to each track position of the disk medium, the bias current for retaining the head is measured at each track position when the head is moved from inside to outside in the calibration of the disk apparatus, and this bias current is stored in a control table and is used for the seek control and the head following control.

FIG. 11 is a measurement result of the bias current of the head actuator relative to the seek position at normal temperature. The bias current is changed depending on the seek position and, even at the same cylinder position, the bias current has different hysteresis in the forward direction when the head actuator is moved from outside to inside and in the reverse direction when the head actuator is moved reversely from inside to outside. The bias current has forward-direction bias current characteristics 126-1 shown by a solid line in the forward direction and has reverse-direction bias current characteristics 128-1 shown by a dotted line in the reverse direction. With regard to the forward-direction bias current characteristics 126-1 and the reverse-direction bias current characteristics 128-1 having this hysteresis, for example, the bias current at a cylinder position X has a higher bias current I1 in the forward direction and a lower bias current I2 in the reverse direction to generate a bias current difference $\Delta I1$.

FIG. 12 is a measurement result of the bias current relative to the seek position at high temperature and, as compared to the case of normal temperature, the reverse-direction bias current characteristics 128-2 of the dotted line tends to become smaller relative to the forward-direction bias current characteristics 126-2 of the solid line depending on the mechanical variations of the head actuator. That is, a bias current difference $\Delta I2$ becomes smaller between the forward-direction bias current I1 and the reverse-direction bias current I2 at the X cylinder same as FIG. 11, as compared to the bias current difference $\Delta I1$ at normal temperature of FIG. 11.

FIG. 13 is forward-direction bias current characteristics 126-3 and reverse-direction bias current characteristics 128-3 at the time of seeking at low temperature, and a bias current difference $\Delta I3$ tends to become larger between the forward-direction bias current I1 and the reverse-direction bias current I2 as compared to the case of normal temperature of FIG. 11 at the cylinder X same as the case of normal temperature of FIG. 11. With regard to the bias current difference $\Delta I$ between the forward direction and the reverse direction of the head actuator, it is experimentally confirmed that the greater bias current difference $\Delta I$ is, the longer the retention time T for increasing the integral gain n-times must be extended. Therefore, by extending the retention time T for increasing the integral gain n-times at low temperature and by setting the retention time T for increasing the integral gain n-times shorter at normal temperature or high temperature, the retention time for increasing the integral gain can be optimized depending on the temperature conditions.

From the calibration of the bias current shown in FIG. 11 to FIG. 13, a characteristic graph can be obtained for optimizing the retention time T relative to temperatures, using the bias current difference $\Delta I$ as a parameter as shown in FIG. 14, for example. Characteristics 130-1 shown in FIG. 14 are the case of the bias current difference $\Delta I=20$ milliamperes; characteristics 130-2 are the case of the bias current difference $\Delta I=10$ milliamperes; and characteristics 130-3 are the case of the bias current difference $\Delta I=40$ milliamperes. The characteristic graph of FIG. 14 is stored in the control table 58 of the nonvolatile memory 32 of FIGS. 6A and 6B in this embodiment.

FIG. 15 is an explanatory diagram of the control table created based on the characteristic graph of FIG. 14, and retention time T11 to T33 is stored for each temperature 134 of 0 deg C., 25 deg C., and 60 deg C. of the apparatus's service temperature range when the bias current difference 132 is $\Delta=10$ milliamperes, 20 milliamperes, and 40 milliamperes. To determine the retention time T for increasing the integral gain with the use of the characteristic graph of FIG. 14, for example, in the initializing process at the time of the activation of the magnetic disk apparatus: the bias currents are detected at a certain measurement track X when the head actuator is moved in the forward direction and the reverse direction to obtain the bias current difference $\Delta I$; if the bias current difference $\Delta I$ is, for example, 20 milliamperes, the characteristics 130-1 of FIG. 14 are selected; and for the characteristics 130-1, T=2 ms is determined as the retention time T that corresponds to the detected temperature, for example, 25 deg C. When the apparatus is operated, if temperature change exceeding a predetermined value is detected, the characteristics of FIG. 14 is selected again by detecting the bias current difference between the forward direction and the reverse direction as is the case of the activation, and the retention time T is determined correspondingly to temperature for the newly selected characteristics. In FIG. 14, since only three characteristics are obtained for the bias current differences $\Delta I=10$ milliamperes, 20 milliamperes, and 40 milliamperes, intermediate characteristics may be characteristics obtained from interpolation calculations using two adjacent characteristics. The same applies to the case of using the control table of FIG. 15, and if a lower limit and an upper limit are 10 milliamperes of bias current differences ΔI and 40 milliamperes of bias current differences ΔI respectively, the retention time of each temperature may be obtained from the interpolation calculations in other cases. Since only the temperatures of three points are obtained which are 0 deg C., 25 deg C., and 60 deg C., the retention time corresponding to intermediate temperatures may be calculated and used from the interpolation calculations. Of course, the bias current differences having a certain level of resolution and the retention times corresponding to temperatures may be created in the control table 58.

FIGS. 16A and 16B are flowcharts of the seek control according to the embodiment of FIGS. 6A and 6B. In FIGS. 16A and 16B, when the magnetic disk apparatus 10 is turned on, predetermined initializing processes are performed at step S1 and, at step S2, in one of the initializing processes, a setting process is performed for the retention time for increasing the integral gain used in the position control. At step S3, it is checked whether the command from the host is received or not; if the command is not received, it is checked at step S14 whether temperature change exceeds a predetermined temperature or not; if the temperature change exceeds the predetermined temperature, the procedure goes back to step S2 to perform the setting process of the retention time for increasing the integral gain again. If the command is received at step S3, the movement controlling unit 52 performs the speed control correspondingly to the number of the remaining tracks to the target track at step S4, and when the number of the remaining tracks becomes a predetermined value or less at step S5, the position controlling unit 54 is operated at step S6 to start the position control in accordance with the PI control setting the n-times integral gain. When the arrival at the target track is determined at step S7, the speed control of the movement controlling unit 52 is terminated at step S8, and the procedure goes to the settling control that enables the position control. During the settling with the position control, the elapsed time from the start of the position control is measured at step S9 to determine whether the retention time of the n-times integral gain has been elapsed or not. This retention time is the time set at step S2. When the retention time has elapsed, the procedure goes to step S10 to perform the gain switch-over process that switches the n-times integral gain to the one-timer integral gain. This gain switch-over is the gain switch-over shown in any one of FIGS. 5B to 5D. At step S11, it is checked whether or not the head position is within the settling slice; if the head position converges within the settling slice, the end of the seeking is recognized by outputting the access permission signal at step S12; and the write operation or read operation is performed based on the command received at step S3. Such a process is repeated until a stop instruction exists at step S13.

FIG. 17 is a flowchart of details of the integral gain retention time setting process at step S2 of FIGS. 16A and 16B. In this retention time setting process, the bias current I1 at the measurement track X is measured by performing the seeking of the head actuator in the forward direction at step S1; the bias current I2 at the measurement track X is measured by performing the seeking of the head actuator in the reverse direction at step S2; and the bias current difference ΔI is calculated at step S3. At step S4, the characteristics of the temperature and the retention time corresponding to the bias current difference ΔI is selected from the control table 58 of FIG. 15, for example, and the retention time T of the n-times gain is determined correspondingly to the detected temperature from the characteristics of the temperature and the retention time at step S5. In this embodiment, with regard to a program stored in the nonvolatile memory 32 of FIGS. 6A and 6B for achieving the function of the seek controlling unit 50, the program is provided with the contents of the flowcharts of FIGS. 11 and 12. Although the integral gain is increased n-times to perform the position control in accordance with the PI calculations when the head arrives at the target track and the position control is started in this embodiment, the multiplication constant n may be an optimum value determined through the calibration of the apparatus. Although the function of the seek controlling unit 50 is achieved by the program control of the MPU 26 in this embodiment, a DSP may be further provided as a dedicated chip for the servo control including the seek controlling unit and this DSP may include the function of the seek controlling unit 50. Although this embodiment exemplifies a servo controller which is a control system with two degrees of freedom shared by the movement controlling unit 52 and the position controlling unit 54, the control system may be provided with servo controllers individually for the movement controlling unit and the position controlling unit and may output the results of the two servo controllers to the same control target VCM. Although the magnetic disk apparatus is used as an example of the storage apparatus in this embodiment, the present invention may be applied directly to any storage apparatuses as long as the storage apparatus is configured to drive an actuator to move and position a head to a track on a disk medium. The present invention encompasses any modifications without impairing the objects and advantages thereof and is not limited by numeric values shown in the above embodiments.

What is claimed is:

1. A storage apparatus comprising:
    a head actuator that positions a head at a position on a medium;
    a movement controlling unit that performs movement control of a head toward a target track on a medium by driving the head actuator;
    a position controlling unit that performs position control of the head actuator in accordance with proportional integral calculations such that a deviation of a head position relative to a track center is eliminated when the moving head arrives at the target track;
    a gain retaining unit that retains an integral gain of the proportional integral calculations in an increased state during a predetermined retention time from the start of the control of the position controlling unit; and
    a gain switching unit that switches the increased integral gain smoothly to the original integral gain when the retention time has elapsed.

2. The storage apparatus according to claim 1, wherein the gain switching unit reduces the increased integral gain linearly for switching to the original integral gain.

3. The storage apparatus according to claim 1, wherein the gain switching unit reduces the increased integral gain smoothly at an earlier stage of a switching period, reduces drastically at a medium stage, and reduces smoothly at a later stage for switching to the original integral gain.

4. The storage apparatus according to claim 1, wherein the gain switching unit reduces the increased integral gain exponentially for switching to the original integral gain.

5. The storage apparatus according to claim 1, wherein the gain retaining unit detects temperature to determine the retention time of the increased integral gain depending on the detected temperature.

6. The storage apparatus according to claim 1, wherein the gain retaining unit determines the retention time such that the retention time becomes longer when the temperature is lower and the retention time becomes shorter when the temperature is higher.

7. The storage apparatus according to claim 1, wherein the gain retaining unit includes a control table that stores the retention time corresponding to each temperature within a service temperature range of the apparatus and wherein when a temperature change exceeding a predetermined value is detected at the time of the activation of the apparatus or during the use of the apparatus, the retention time corresponding to the detected temperature is acquired and set from the control table.

8. The storage apparatus according to claim 7,
wherein the control table stores characteristics of the retention time for each temperature within the service temperature range using a parameter that is a bias current difference between a bias current when the head actuator is driven in the forward direction and a bias current when the head actuator is driven in the reverse direction, and
wherein when a temperature change exceeding a predetermined value is detected at the time of the activation of the apparatus or during the use of the apparatus, the gain retaining unit measures the bias current difference to select and use the characteristics of the retention time for each temperature within the service temperature range including the parameter of the detected bias current difference.

9. The storage apparatus according to claim 1,
wherein the movement controlling unit performs speed control of the head actuator depending on the number of remaining tracks from a track where the head is currently located to the target track and terminates the speed control with arrival at the target track, and
wherein the position controlling unit starts the position control in accordance with proportional integral calculations with the integral gain increased when the number of remaining tracks to the target track is reduced by the speed control to a predetermined value or less.

10. A storage apparatus seek control method comprising:
a movement controlling step of performing movement control of a head toward a target track on a medium by driving a head actuator;
a position controlling step of performing position control of the head actuator in accordance with proportional integral calculations such that a deviation of a head position relative to a track center is eliminated when the moving head arrives at the target track;
a gain retaining step of retaining an integral gain of the proportional integral calculations in an increased state during a predetermined retention time from the start of the position control of the position controlling step; and
a gain switching step of switching the increased integral gain smoothly to the original integral gain when the retention time has elapsed.

11. The method according to claim 10, wherein at the gain switching step, the increased integral gain is reduced linearly for switching to the original integral gain.

12. The method according to claim 10, wherein at the gain switching step, the increased integral gain is reduced smoothly at an earlier stage of a switching period, reduced drastically at a medium stage, and reduced smoothly at a later stage for switching to the original integral gain.

13. The method according to claim 10, wherein at the gain switching step, the increased integral gain is reduced exponentially for switching to the original integral gain.

14. The method according to claim 10, wherein at the gain retaining step, temperature is detected to determine the retention time of the increased integral gain depending on the detected temperature.

15. The method according to claim 10, wherein at the gain retaining step, the retention time is determined such that the retention time becomes longer when the temperature is lower and the retention time becomes shorter when the temperature is higher.

16. The method according to claim 10, wherein at the gain retaining step, a control table is generated to store the retention time corresponding to each temperature within a service temperature range of the apparatus and wherein when a temperature change exceeding a predetermined value is detected at the time of the activation of the apparatus or during the use of the apparatus, the retention time corresponding to the detected temperature is acquired and set from the control table.

17. The according to method of claim 16,
wherein the control table stores characteristics of the retention time for each temperature within the service temperature range using a parameter that is a bias current difference between a bias current when the head actuator is driven in the forward direction and a bias current when the head actuator is driven in the reverse direction, and
wherein at the gain retaining step, when a temperature change exceeding a predetermined value is detected at the time of the activation of the apparatus or during the use of the apparatus, the bias current difference is measured to select and use the characteristics of the retention time for each temperature within the service temperature range including the parameter of the detected bias current difference.

18. The method according to claim 10,
wherein at movement controlling step, the speed control of the head actuator is performed depending on the number of remaining tracks from a track where the head is currently located to the target track and the speed control is terminated with arrival at the target track, and
wherein at the position controlling step, when the number of remaining tracks to the target track is reduced by the speed control to a predetermined value or less, the position control is started in accordance with proportional integral calculations with the integral gain increased.

19. A control apparatus comprising:
a movement controlling unit that performs movement control of a head toward a target track on a medium by driving a head actuator;
a position controlling unit that performs position control of the head actuator in accordance with proportional integral calculations such that a deviation of a head position relative to a track center is eliminated when the moving head arrives at the target track;
a gain retaining unit that retains an integral gain of the proportional integral calculations in an increased state during a predetermined retention time from the start of the control of the position controlling unit; and
a gain switching unit that switches the increased integral gain smoothly to the original integral gain when the retention time has elapsed.

20. The apparatus according to claim 19, wherein the gain switching unit reduces the increased integral gain linearly for switching to the original integral gain.

* * * * *